(12) United States Patent
Bowe

(10) Patent No.: US 8,173,083 B2
(45) Date of Patent: May 8, 2012

(54) CATALYTIC REACTORS

(75) Inventor: Michael Joseph Bowe, Preston (GB)

(73) Assignee: CompactGTL plc, Abingdon, Oxfordshire (GB)

( * ) Notice: Subject to any disclaimer, the term of this patent is extended or adjusted under 35 U.S.C. 154(b) by 424 days.

(21) Appl. No.: 11/817,152

(22) PCT Filed: Feb. 15, 2006

(86) PCT No.: PCT/GB2006/050039
§ 371 (c)(1),
(2), (4) Date: Aug. 27, 2007

(87) PCT Pub. No.: WO2006/095204
PCT Pub. Date: Sep. 14, 2006

(65) Prior Publication Data
US 2008/0148635 A1 Jun. 26, 2008

(30) Foreign Application Priority Data

Mar. 5, 2005 (GB) .................................. 0504622.2

(51) Int. Cl.
*B01J 8/00* (2006.01)

(52) U.S. Cl. ........ 422/601; 422/187; 422/600; 422/625; 422/629; 422/631; 48/127.9; 48/127.7; 48/198.7

(58) Field of Classification Search .................. 422/192, 422/196, 198, 204, 211, 220
See application file for complete search history.

(56) References Cited

U.S. PATENT DOCUMENTS

| | | | |
|---|---|---|---|
| 4,849,185 A * | 7/1989 | Wittig | 422/171 |
| 5,853,902 A * | 12/1998 | Usui | 428/593 |
| 6,217,832 B1 | 4/2001 | Betta | |
| 6,287,524 B1 | 9/2001 | Hums | |
| 7,189,468 B2 * | 3/2007 | Izenson et al. | 429/444 |
| 7,250,150 B1 * | 7/2007 | Keefer et al. | 423/651 |
| 2002/0074105 A1 * | 6/2002 | Hayashi et al. | 165/43 |
| 2004/0152794 A1 * | 8/2004 | Huff et al. | 518/726 |
| 2006/0245987 A1 * | 11/2006 | Schmidt | 422/198 |

FOREIGN PATENT DOCUMENTS

| | | |
|---|---|---|
| EP | 0124226 A2 | 11/1984 |
| EP | 0240796 A2 | 10/1987 |
| EP | 0298943 A2 | 1/1989 |
| EP | 0885653 A2 | 12/1998 |

(Continued)

OTHER PUBLICATIONS

Foreign Search Report for Application No. GB0714314.2 dated Jul. 25, 2008.

(Continued)

*Primary Examiner* — Kaity V. Handal
(74) *Attorney, Agent, or Firm* — McDermott Will & Emery LLP

(57) ABSTRACT

A compact catalytic reactor defines a multiplicity of first and second flow channels arranged alternately in the reactor, for carrying first and second fluids, respectively, wherein at least the first fluids undergo a chemical reaction. Each first flow channel containing a removable gas-permeable catalyst structure (20) incorporating a metal substrate, the catalyst structure defining flow paths therethrough, with catalytic material on at least some surfaces of each such path. The catalyst structure also incorporates a multiplicity of projecting resilient lugs (22) which support the catalyst structure (20) spaced away from at least one adjacent wall of the channel (17).

11 Claims, 3 Drawing Sheets

FOREIGN PATENT DOCUMENTS

| | | |
|---|---|---|
| WO | 0151194 A1 | 7/2001 |
| WO | 03033134 A1 | 4/2003 |
| WO | 03048035 A1 | 6/2003 |

OTHER PUBLICATIONS

Foreign Search Report for Application No. PCT/GB2006/050039 dated Sep. 20, 2007.

Foreign Search Report for Application No. GB0504622.2 dated Jun. 20, 2005.

Foreign Search Report for Application No. PCT/GB2006/050039 dated Jun. 14, 2006.

Translation for Foreign Search Report for Application No. 200701897 dated Apr. 14, 2008.

* cited by examiner

CATALYTIC REACTORS

BACKGROUND

1. Field of the Invention

This invention relates to a catalytic reactor suitable for use in a chemical process to convert natural gas to longer-chain hydrocarbons, and to a plant including such catalytic reactors to perform the process.

2. Description of Related Art

A process is described in WO 01/51194 and WO 03/033131 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to longer chain hydrocarbons of higher molecular weight, which are usually liquids or waxes under ambient conditions. The two stages of the process, steam/methane reforming and Fischer-Tropsch synthesis, require different catalysts, and catalytic reactors are described for each stage. In each case the catalyst may comprise a corrugated foil coated with catalytic material. In each case the corrugated foils are of height substantially equal to that of the channels: for example the channels might be of width 20 mm and depth 2.5 mm, the foil having corrugations 2.5 mm high.

SUMMARY OF THE INVENTION

According to the present invention there is provided a compact catalytic reactor defining a multiplicity of first and second flow channels arranged alternately in the reactor, for carrying first and second fluids, respectively, wherein at least the first fluids undergo a chemical reaction; each first flow channel containing a removable gas-permeable catalyst structure incorporating a metal substrate, the catalyst structure defining flow paths therethrough; wherein the catalyst structure incorporates a multiplicity of projecting resilient strips which support the catalyst structure spaced away from at least one adjacent wall of the channel.

The resilient strips may be projecting lugs, attached to the metal substrate at one end.

Preferably each catalyst structure incorporates resilient strips projecting in opposite directions, so that the catalyst structure is spaced away from both opposed adjacent walls of the channel. Where chemical reactions are to take place in both the first and second flow channels, then the second flow channels would also contain a removable gas-permeable catalyst structure incorporating such projecting resilient strips.

The reactor may be made of an aluminium alloy, stainless steel, high-nickel alloys, or other steel alloys, depending on the temperature and pressure required for the reactions, and the nature of the fluids, both reactants and products. The catalyst structures do not provide strength to the reactor, so the reactor itself must be sufficiently strong to resist any pressure forces during operation. It will be appreciated that the reactor may be enclosed within a pressure vessel so as to reduce the pressure forces it experiences, or so that the pressure forces are only compressive.

The reactor must also be provided with headers to supply the fluids to the flow channels, and preferably each first header comprises a chamber attached to the outside of the reactor and communicating with a plurality of the first flow channels, and each second header comprises a chamber attached to the outside of the reactor and communicating with a plurality of the second flow channels, such that after removal of a header, the corresponding catalyst layers in the flow channels are removable. This ensures that the catalysts can easily be replaced when they become spent.

The catalyst structure preferably incorporates a ceramic coating to carry the catalytic material. Preferably the metal substrate for the catalyst structure is a steel alloy that forms an adherent surface coating of aluminium oxide when heated, for example an aluminium-bearing ferritic steel such as iron with 15% chromium, 4% aluminium, and 0.3% yttrium (e.g., FECRALLOY). When this metal is heated in air it forms an adherent oxide coating of alumina, which protects the alloy against further oxidation and against corrosion. Where the ceramic coating is of alumina, this appears to bond to the oxide coating on the surface. The substrate may be a wire mesh or a felt sheet, but the preferred substrate is a thin metal foil for example of thickness less than 100 µm, and the substrate may be corrugated, pleated or otherwise shaped so as to define a multiplicity of flow paths.

In one preferred embodiment the substrate of the catalyst structure is a foil corrugated into castellations (rectangular corrugations), and resilient lugs project above and below the castellations, being integral with the foil and being formed by punching out from the castellated foil. Other shapes of corrugations are also possible.

In another embodiment the substrate is again a foil, the foil being cut by parallel slits, and foil strips between the slits being deformed into a curve projecting above or below the adjacent parts of the substrate. This is applicable even where the rest of the substrate is flat.

The metal substrate of the catalyst structure within the flow channels enhances heat transfer within the catalyst structure, preventing hot spots or cold spots, enhances catalyst surface area, and provides mechanical strength. The projecting strips ensure that the catalyst structure does not become jammed in the channel, for example due to differential thermal expansion, and they also allow for differences in the dimensions of the catalyst structure and the channel that may arise due to manufacturing tolerances. They also allow all the surfaces of the catalyst structure to be effectively contacted by the flowing reactants, as a gap is created between the channel walls and the catalyst structure. The flow paths defined by the catalyst structure may have any suitable cross-sectional shape, but would typically be rectangular; and by virtue of the gaps between projecting strips adjacent flow paths along the outside of the catalyst structure communicate with each other. Preferably all the surfaces forming the catalyst structure incorporate catalytic material.

Where the channel depth is no more than about 3 mm, then the catalyst structure may for example be a single shaped foil. Alternatively, and particularly where the channel depth is greater than about 2 mm, the catalyst structure may comprise a plurality of such corrugated foils separated by substantially flat foils; the corrugated foils and flat foils may be linked to each other, for example by similar projecting lugs locating in corresponding slots, or alternatively may be inserted as separate items. To ensure the required good thermal contact, for example with a Fischer-Tropsch reactor, the channels are preferably less than 20 mm deep, and more preferably less than 10 mm deep, and for a steam/methane reforming reactor the channels are preferably less than 5 mm deep. But the channels are preferably at least 1 mm deep, or it becomes difficult to insert the catalyst structures, and engineering tolerances become more critical. Desirably the temperature within the channels is maintained uniformly across the channel width, within about 2-4° C., and this is more difficult to achieve the larger the channel becomes.

The reactor may comprise a stack of plates. For example, first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. The stack of plates forming the reactor is bonded together for example by diffusion bonding, brazing, or hot isostatic pressing.

Hence a plant for processing natural gas to obtain longer chain hydrocarbons may incorporate a steam/methane reforming reactor of the invention, to react methane with steam to form synthesis gas, and a Fischer-Tropsch reactor of the invention to generate longer-chain hydrocarbons.

BRIEF DESCRIPTION OF THE DRAWINGS

The invention will now be further and more particularly described, by way of example only, and with reference to the accompanying drawings, in which.

DETAILED DESCRIPTION

Figure 8:
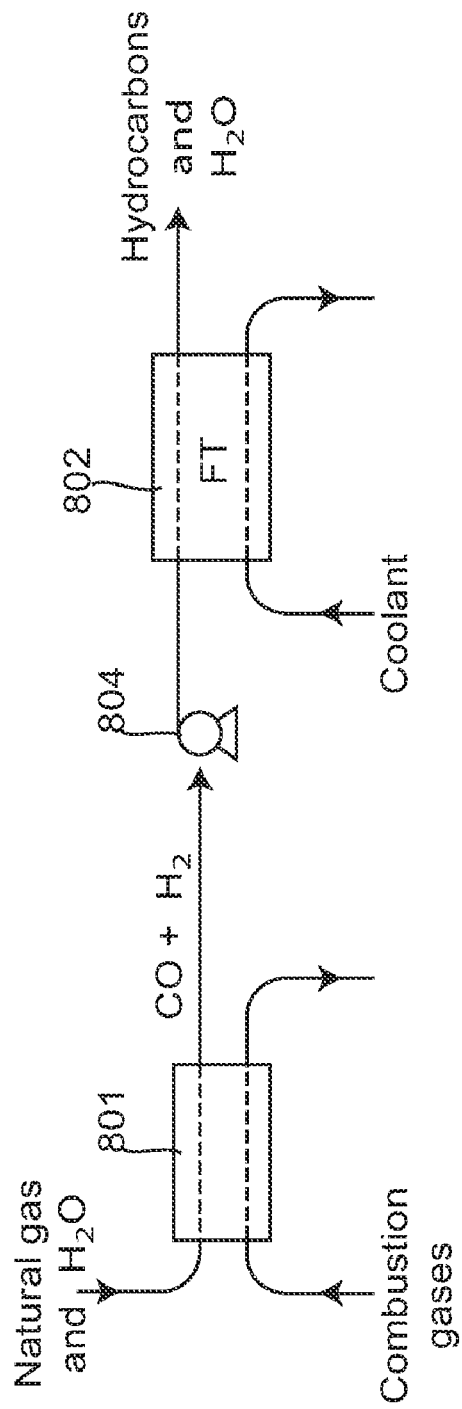
FIG. 8 shows a flow diagram of a process which may use reactors of the disclosure.

The invention is applicable to a wide range of different chemical reactions, particularly those involving gaseous reactants and requiring a catalyst. For example it would be applicable in a chemical process for converting natural gas (primarily methane) to longer chain hydrocarbons. This can be achieved by a two-stage process, shown in FIG. 8, and each stage might use a reactor of the invention. The first stage is steam reforming, in a reactor 801, in which steam is mixed with natural gas and heated to an elevated temperature (so as to reach say 800° C.) so that reforming occurs:

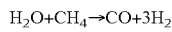

This reaction is endothermic, and may be catalysed by a rhodium or platinum/rhodium catalyst in a flow channel. The heat required to cause this reaction may be provided by combustion of an inflammable gas such as methane or hydrogen, which is exothermic and may be catalysed by a platinum/palladium catalyst in an adjacent second gas flow channel of the reactor 801.

The gas mixture produced by the steam/methane reforming is then used to perform a Fischer-Tropsch synthesis in a reactor 802 to generate a longer chain hydrocarbon, that is to say:

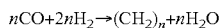

which is an exothermic reaction, occurring at an elevated temperature, typically between 190° C. and 280° C., and an elevated pressure typically between 1.5 MPa and 2.5 MPa (absolute values), in the presence of a catalyst such as iron, cobalt or fused magnetite. The preferred catalyst for the Fischer-Tropsch synthesis comprises a coating of gamma-alumina of specific surface area 140-230 $m^2/g$ with about 10-40% cobalt (by weight compared to the alumina), and with a promoter such as ruthenium, platinum or gadolinium which is less than 10% of the weight of the cobalt, and a basicity promoter such as lanthanum oxide.

The stream of high pressure carbon monoxide and hydrogen produced by steam methane reforming in the reactor 801 is cooled, and compressed to the elevated pressure, say 2.0 MPa, using a compressor 804, and is then fed to the catalytic Fischer-Tropsch reactor 802, which may be a reactor of the invention; the reactant mixture flows through one set of channels, while a coolant flows through the other set.

The reaction products from the Fischer Tropsch synthesis, predominantly water and hydrocarbons such as paraffins, are cooled to condense the liquids by passage through a heat exchanger and a cyclone separator followed by a separating chamber in which the three phases water, hydrocarbons and tail gases separate, and the hydrocarbon product is stabilised at atmospheric pressure. The hydrocarbons that remain in the gas phase and excess hydrogen gas (the Fischer-Tropsch tail gases) are collected and split. A proportion may be passed through a pressure reduction valve to provide the fuel for the catalytic combustion process in the reformer (as described above). The remaining tail gases may be fed to a gas turbine arranged to generate electricity. The major plant electrical power needs are the compressors used to raise the pressure to that required for the Fischer-Tropsch reaction; electricity may also be used to operate a vacuum distillation unit to provide process water for steam generation.

Figure 1:
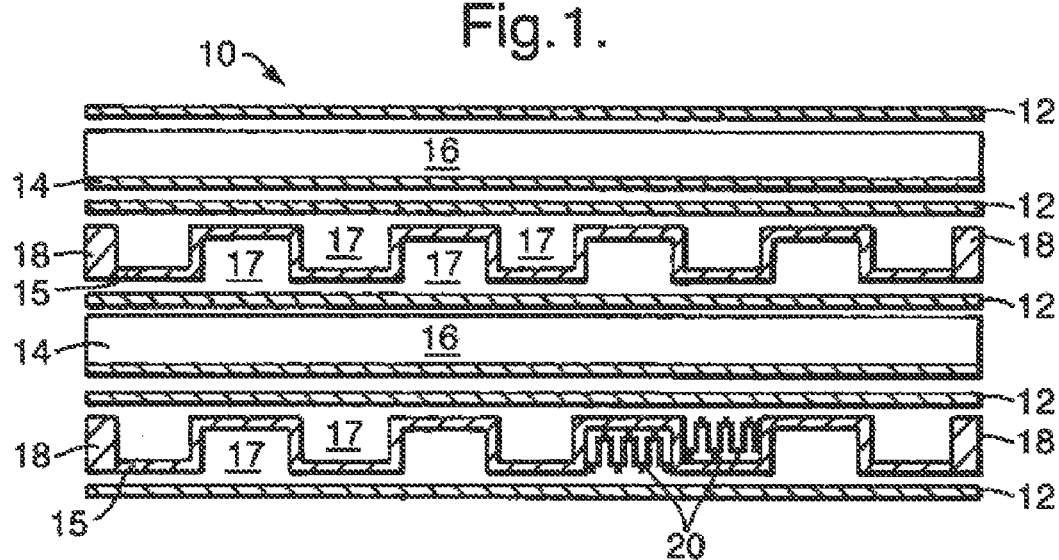
FIG. 1 shows a sectional view of part of a compact catalytic reactor.

Referring now to FIG. 1 there is shown a reactor block 10 suitable for use as a steam reforming reactor, with the components separated for clarity. The reactor block 10 consists of a stack of plates that are rectangular in plan view, each plate being of corrosion resistant high-temperature steel such as INCONEL 800HT or HR-120®. Flat plates 12 of thickness 1 mm are arranged alternately with castellated plates 14, 15 in which the castellations are such as to define straight-through channels 16, 17 from one side of the plate to the other. The castellated plates 14 and 15 are arranged in the stack alternately, so the channels 16, 17 are oriented in orthogonal directions in alternate castellated plates 14, 15. The thickness of the castellated plates 14 and 15 (typically in the range between 0.2 and 3.5 mm) is in each case 0.75 mm. The height of the castellations (typically in the range 2-10 mm) is 3 mm in this example, and solid edge strips 18 of the same thickness are provided along the sides. In the castellated plates 15 which define the combustion channels 17 the wavelength of the castellations is such that successive ligaments are 25 mm apart, while in the castellated plates 14 which define the reforming channels 16 successive ligaments are 15 mm apart.

A reactor block similar to that of FIG. 1 would also be suitable for use as a Fischer-Tropsch reactor, in this case defining channels for a coolant fluid alternating with channels for the Fischer-Tropsch synthesis. The channels for coolant might for example be 2 mm high (typically in the range 1 to 4 mm) and channels for the Fischer-Tropsch synthesis might be of height 5 mm (typically in the range 3 to 10 mm). In this case the reactor does not operate at such a high-temperature, so the structural components may be of aluminium alloy, for example 3003 grade (aluminium with about 1.2% manganese and 0.1% copper).

In either case the stack is assembled as described above, and bonded together, for example by brazing or hot isostatic pressing. Catalyst carriers 20 (only two are shown) are then inserted into the channels in which reactions are to occur, carrying appropriate catalysts. Appropriate headers can then be attached to the outside of the stack. Each catalyst carrier 20 incorporates a metal foil substrate which assists in dissipating heat uniformly across the surface of the catalyst to reduce or eliminate the development of hot spots, and also provides structural integrity to the catalyst. However it has now been appreciated that in many cases heat conduction from the catalyst to the channel walls is not critical; in the case of the combustion and reforming reactions, this is because heat transfer between the catalyst carrier 20 and the walls of the channel occurs primarily through convection and radiation; and in the case of the Fischer-Tropsch reaction the bulk of the heat transfer occurs through convection between the catalyst carrier 20 and the walls of the channel.

Figure 2:
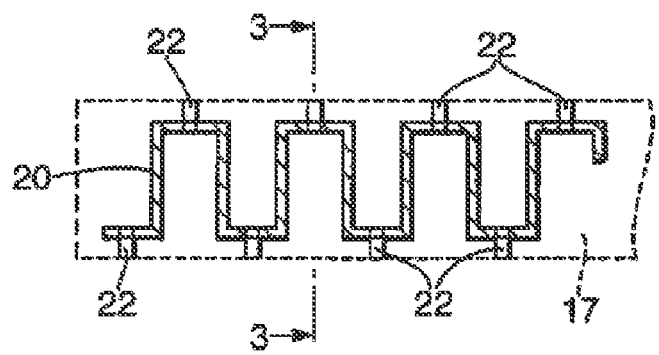
FIG. 2 shows a catalyst carrier for use in the reactor of FIG. 1.

Referring now to FIG. 2, in which the channel walls are shown only by broken lines, each catalyst carrier 20 comprises a 50 μm thick FECRALLOY foil corrugated into a castellated shape (with rectangular corrugations), the total height of the corrugations being 1 mm less than the height of the channel. The foil is coated with a ceramic coating (not shown separately in the figures) such as alumina of thickness typically in the range 30-80 μm (for combustion or steam reforming), and the active catalytic material (such as platinum/rhodium, in the case of steam reforming) is incorporated into the ceramic. Resilient lugs 22 are also stamped out from the foil during the corrugation process, these being for example of width 0.5 mm and length 1.5 mm, remaining integral with the foil at one end, and projecting above or below the corrugations. These may for example be provided at 25 mm spacings along the length of the foil, and may (as shown) be provided in every corrugation, or at any rate at least once every two or three corrugations across the width of the foil.

Figure 3:
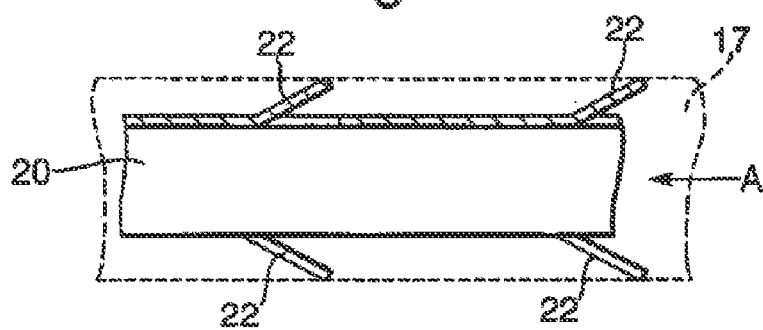
FIG. 3 shows a sectional view of the catalyst carrier of FIG. 2, on the line 3-3 of FIG. 2.

As shown in FIG. 3, the lugs 22 projecting above and below the catalyst carrier 20 are at substantially the same positions along the length of the catalyst carrier 20, and when the catalyst carrier 20 is inserted into the channel the lugs 22 are compressed and pushed into a sloping position. The catalyst carrier 20 is therefore supported resiliently by the lugs 22.

It will be appreciated that the resilience of the lugs 22 can accommodate for any differential thermal expansion of the reactor block and the catalyst carriers 20, and for any bowing of the channel as a result of thermal stress, and also allows for any discrepancy between the height of the catalyst carrier 20 and that of the corresponding channel (as can arise as a result of manufacturing tolerances). However, the lugs 22 require that the catalyst carriers 20 are both installed and removed in the direction of the arrow A in FIG. 3, so that removable headers must be provided at both ends of each channel.

It will be appreciated that the corrugations might have a different shape to that shown here; they may for example have a different ratio of height to width of each corrugation from that shown, for example being square rather than rectangular corrugations. Furthermore the corrugations might be a different shape altogether, for example the vertical parts of the corrugations shown in FIG. 2 might instead be inclined to form a zigzag shape with flat tops; yet again the corrugations might instead be arcuate or sinusoidal. The lugs might be spaced differently from those described above and might be of a different shape or size. There might be lugs on only one side of the catalyst insert, instead of lugs being provided on both the opposed surfaces.

It will also be appreciated that in some cases, for example with a channel that is of height above about 4 mm, it is appropriate to use an assembly of corrugated catalyst carriers separated by substantially flat foils which may also be catalyst carriers. For example in a 6 mm channel there might be two corrugated foil catalyst carriers each of height 2.5 mm, separated by a substantially flat foil. In this case lugs need only be provided on the surfaces of catalyst carriers that are adjacent to a wall of the channel—projecting from the top of the top corrugated foil, and from the bottom of the bottom corrugated foil, in this example. Similar lugs might also be provided for interlocking the foils together, for example lugs projecting from the lower surface of the upper corrugated catalyst carrier and from the upper surface of the lower corrugated catalyst carrier might locate in corresponding slots in the flat foil; such lugs might be inclined in the opposite direction to those adjacent to the channel walls. And alternatively lugs might be provided projecting below and above the flat foil, and locating in corresponding slots in the corrugated foils.

It will be appreciated that this catalyst structure, because it is spaced apart from the wall by the lugs 22, provides an increased cross-sectional area for fluid flow, reducing the local gas velocity and the pressure drop across the reactor block.

In the embodiment described above the resilient lugs 22 are shown as being connected to the remaining parts of the foil at one end, and extending in a generally straight line (in a cantilever fashion). The resilient lugs might alternatively be curved along their length, and indeed may be connected to remaining parts of the foil at both ends. Furthermore, in the embodiment described above the catalyst carrier is itself corrugated. By using corrugated foils, the voidage (the proportion of the cross-sectional area of the channel which is available for bulk flow of fluids) can be adjusted to a desired value, for examples by changing the wavelength or the height of the corrugations. In an alternative, the foils might be substantially flat, and a catalyst carrier within a channel could be formed by several such substantially flat foils spaced apart by resilient strips or lugs. In such an arrangement the voidage can be adjusted by changing the height of the resilient strips or lugs, and hence changing the number of foils that form the stack and occupy the channel. An additional aspect of this structure is that the openings in the foil formed by the cut out strips and the additional turbulence generated by the upstanding strips can help in promoting turbulence and fluid mixing between fluids on opposite sides of a foil, to minimise stratification of fluid and temperature gradients.

Figure 4:
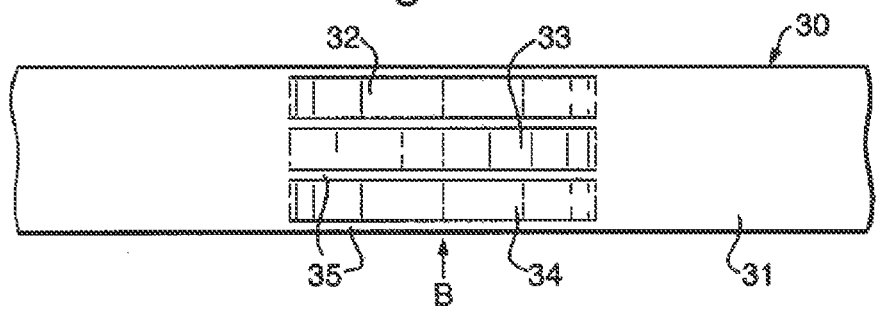
FIG. 4 shows a plan view of an alternative catalyst carrier for use in the reactor of FIG. 1.

Referring now to FIG. 4, an alternative catalyst carrier 30 comprises a FECRALLOY foil 31 which is mainly flat, and of a suitable width to fit into the corresponding flow channel 16 or 17. In this case the foil 31 is 8 mm wide (to fit into a flow channel 16 or 17 of width about 8.5 mm). At intervals of 45 mm along its length the foil 31 is provided with six parallel longitudinal slits defining three strips 32, 33 and 34 each of width 2 mm and of length 10 mm separated by narrow strips 35 of width 0.5 mm; as the slits are cut the strips 32, 33 and 34 are stretched and bowed into a curve either above or below the flat remainder of the foil 31. Across the width of the foil, alternate strips 32, 33 or 34 project above and below the remainder of the foil 31; in this case strips 32 and 34 project above, and strip 33 projects below. Preferably, at the next such position along the length of the foil 31, the corresponding strips 32 and 34 project below, while the corresponding strip 33 projects above.

Figure 5:
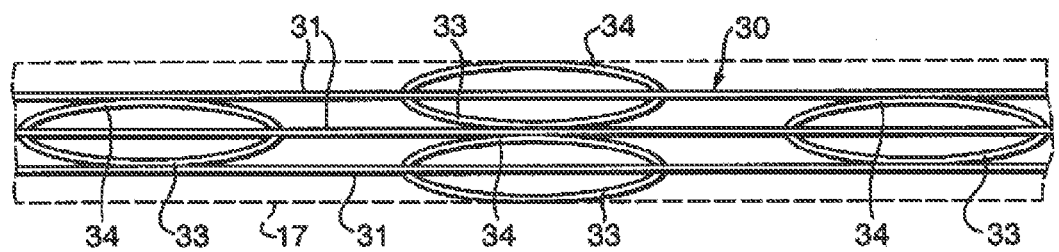
FIG. 5 shows a side view in the direction of arrow B of FIG. 4, after insertion of the catalyst carrier into a flow channel.

As shown in FIG. 5, which shows a side view of the catalyst carrier 30 in position in a channel 17 (shown by a broken line), the catalyst carrier 30 consists of a stack of three catalyst foils 31 each with projecting strips 32, 33 and 34 forming peaks at intervals of 45 mm along the length of the foil 31. The positions of the projecting strips 32, 33 and 34 are different in adjacent foils 31 in the stack, so that the positions of the peaks in one foil 31 are midway between the positions of the peaks in the adjacent foil 31. In this example, the overall height of the stack is 5.5 mm before insertion into the channel 17, but the channel 17 is of height 5.0 mm, so that the projecting strips 32, 33 and 34 are slightly compressed after insertion.

Figure 6:
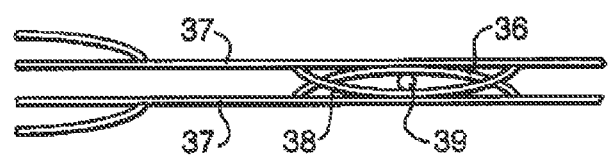
FIG. 6 shows a side view of an alternative catalyst carrier.

In a modification to the catalyst carrier of FIGS. 4 and 5, shown in FIG. 6 to which reference is now made, upward-projecting strips 36 on one foil 37 fit in between downward-projecting strips 38 on the next foil in the stack, and in that situation the adjacent foils 37 in the stack can be secured to each other by inserting pins 39 to interlock those strips 36 and 38.

Figure 7:
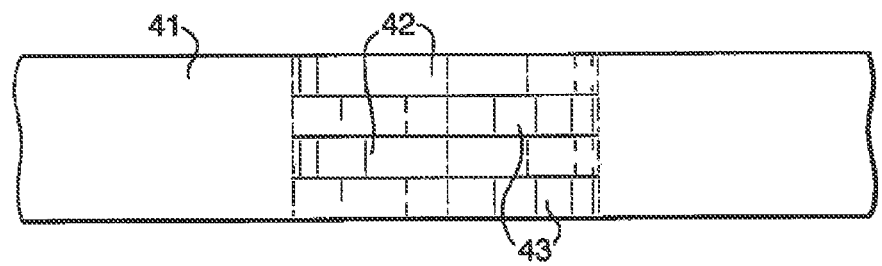
FIG. 7 shows a plan view of another alternative catalyst carrier for use in the reactor of FIG. 1.

Referring now to FIG. 7, in another modification to the catalyst carrier of FIGS. 4 and 5, a FECRALLOY foil 41 is again mainly flat, but in this case the slits are all equally spaced across the width, so the entire width of the foil defines strips, and adjacent resulting strips 42 and 43 are bowed into curves above and below the flat remainder of the foil 41 respectively. (In this case there are no narrow flat strips between adjacent curved strips 42 and 43.) Such slits and curved strips 42 and 43 are formed at intervals of say 40 mm along the length of the foil 41. It will be appreciated that, in side view, this catalyst carrier would look similar to that of FIG. 5.

The catalyst carrier foils 31, 37 and 41 as shown in FIGS. 4 to 7 may be provided with catalytic material in a similar way to that described above, for example by depositing a ceramic coating for example of alumina as the catalyst support, and incorporating a suitable active catalytic material into the ceramic support. It will be appreciated that the separation between successive peaks or troughs (defined by the curved strips 32-34 or 42, 43) along the length of the foil may have substantially any desired value, but is typically less than 75 mm, for example between 5 and 50 mm. This will, however, depend upon the thickness of the carrier foil 31 or 41, and hence its rigidity, as the engagement between the peaks on one foil and the flat foil portion on the adjacent foil in the stack provides support. Similarly, the dimensions of the curved strips 32-34 and 42, 43 may differ from those described above. As indicated in FIG. 6, a stack of foils can be secured together, in some cases, by inserting interlocking pins, while in other situations successive foils may be spot welded together.

The invention claimed is:

1. A compact catalytic reactor comprising a multiplicity of first and second flow channels arranged alternately in said reactor, for carrying first and second fluids, respectively, wherein at least said first fluids undergo a chemical reaction; each first flow channel containing a removable gas-permeable catalyst structure incorporating a metal foil substrate, said catalyst structure defining flow paths therethrough; wherein said substrate comprises corrugated foil; wherein said catalyst structure incorporates a multiplicity of resilient strips which are bent out from the foil substrate peaks so as to project from the substrate peaks and to support said catalyst structure resiliently spaced away from at least one adjacent wall of said channel, each strip being connected to said catalyst structure only at an end of said strip, and being integral with said foil; and wherein said catalyst structure, excluding said projecting strips, is of height less than a corresponding height of said channel by between 0.1 mm and about 1 mm.

2. A catalytic reactor as claimed in claim 1 wherein chemical reactions occur in both said first and said second flow channels, and wherein second flow channels contain removable gas-permeable catalyst structures that incorporate a metal foil substrate, and which define flow paths therethrough, wherein said catalyst structure incorporates a multiplicity of projecting resilient strips which support said catalyst structure spaced away from at least one adjacent wall of said channel, each strip being connected to said catalyst structure only at ends of said strip, and being integral with said foil.

3. A catalytic reactor as claimed in claim 1 wherein said catalyst structure comprises resilient strips projecting in opposite directions, so that said catalyst structure is spaced away from both opposed adjacent walls of said channel.

4. A catalytic reactor as claimed in claim 1 wherein said catalyst structure comprises said metal foil corrugated into castellations, and said resilient strips project from peaks of said castellations.

5. A catalytic reactor as claimed in claim 4 wherein said resilient strips comprise projecting lugs, attached to said foil at one end.

6. A catalytic reactor as claimed in claim 1 wherein said first fluids undergo steam reforming.

7. A catalytic reactor as claimed in claim 1 wherein said first fluids undergo Fischer-Tropsch synthesis.

8. A plant for processing natural gas for obtaining longer chain hydrocarbons, said plant comprising
a first reactor as defined by claim 1, wherein said first fluids undergo steam reforming, for reacting methane with steam for forming synthesis gas, and
a second reactor as defined by claim 1,
wherein the second reactor is configured to be fed a stream from the first reactor;
wherein said first fluids undergo Fischer-Tropsch synthesis for generating longer-chain hydrocarbons;
wherein the first reactor is a reforming reactor; and
wherein the second reactor is a synthesis reactor.

9. A compact catalytic reactor as claimed in claim 1 wherein said substrate comprises a corrugated foil, and the corrugations are rectangular.

10. A compact catalytic reactor comprising a multiplicity of first and second flow channels arranged alternately in the reactor, for carrying first and second fluids, respectively, wherein at least said first fluids undergo a chemical reaction; each first flow channel containing a removable gas-permeable catalyst structure incorporating a metal foil substrate, said catalyst structure defining flow paths therethrough; wherein said substrate comprises corrugated foil; wherein said catalyst structure incorporates a multiplicity of resilient strips which are bent out from the foil substrate peaks so as to project from the substrate peaks and to support said catalyst structure resiliently spaced away from at least one adjacent wall of said channel, each strip being connected to the catalyst structure only at an end of the strip, and being integral with a said foil.

11. A compact catalytic reactor as claimed in claim 10 wherein said substrate comprises a corrugated foil, and the corrugations are rectangular.

* * * * *